US009883439B2

United States Patent
Shi et al.

(10) Patent No.: US 9,883,439 B2
(45) Date of Patent: Jan. 30, 2018

(54) OFFLOADING METHOD AND APPARATUS

(71) Applicant: HUAWEI TECHNOLOGIES CO., LTD., Shenzhen, Guangdong (CN)

(72) Inventors: Xiaoli Shi, Shanghai (CN); Tianle Deng, Shanghai (CN); Haiyan Luo, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/471,395

(22) Filed: Mar. 28, 2017

(65) Prior Publication Data
US 2017/0201920 A1 Jul. 13, 2017

Related U.S. Application Data

(63) Continuation of application No. PCT/CN2014/087782, filed on Sep. 29, 2014.

(51) Int. Cl.
*H04W 36/00* (2009.01)
*H04W 36/14* (2009.01)
(Continued)

(52) U.S. Cl.
CPC ......... *H04W 36/14* (2013.01); *H04L 61/6081* (2013.01); *H04W 36/36* (2013.01);
(Continued)

(58) Field of Classification Search
CPC . H04W 36/14; H04W 36/36; H04W 72/1273; H04W 76/046; H04W 84/042;
(Continued)

(56) References Cited

U.S. PATENT DOCUMENTS 7,581,030 B2 * 8/2009 Dowling ............... G06Q 20/04
370/349
9,516,569 B2 12/2016 Duan et al.
(Continued)

FOREIGN PATENT DOCUMENTS

CN 103517360 1/2014
CN 103582020 2/2014
(Continued)

OTHER PUBLICATIONS

International Search Report, dated Jul. 1, 2015, in International Application No. PCT/CN2014/087782 (4 pp.).
(Continued)

*Primary Examiner* — Charles Shedrick
(74) *Attorney, Agent, or Firm* — Staas & Halsey LLP

(57) ABSTRACT

The present disclosure relates to the field of mobile communications technologies, and in particular, to an offloading method and an apparatus. In this solution, when a terminal is in a handover process, a destination cellular network node sends, to the terminal, configuration information of a WLAN AP managed by the destination cellular network node; and then the terminal selects a destination WLAN AP from WLAN APs managed by the destination cellular network node, and offloads data of the destination cellular network node to the destination WLAN AP. Therefore, the destination WLAN AP selected by the destination cellular network node can be received before a handover is completed, thereby ensuring service continuity and improving service quality of a terminal.

16 Claims, 8 Drawing Sheets

(51) Int. Cl.

| | | |
|---|---|---|
| *H04W 36/36* | (2009.01) | |
| *H04L 29/12* | (2006.01) | |
| *H04W 72/12* | (2009.01) | |
| *H04W 84/12* | (2009.01) | |
| *H04W 84/04* | (2009.01) | |
| *H04W 76/04* | (2009.01) | |
| *H04W 88/12* | (2009.01) | |

(52) U.S. Cl.
CPC ...... *H04W 72/1273* (2013.01); *H04W 76/046* (2013.01); *H04W 84/042* (2013.01); *H04W 84/12* (2013.01); *H04W 88/12* (2013.01)

(58) Field of Classification Search
CPC .... H04W 84/12; H04W 88/12; H04L 61/6081
USPC .............................................. 455/432.1, 418
See application file for complete search history.

(56) References Cited

U.S. PATENT DOCUMENTS

| | | | |
|---|---|---|---|
| 9,549,356 B2 | 1/2017 | Hou et al. | |
| 2001/0049790 A1* | 12/2001 | Faccin | H04L 63/104 713/185 |
| 2006/0031941 A1* | 2/2006 | Xiao | G06F 21/51 726/27 |
| 2007/0157022 A1* | 7/2007 | Blom | H04L 63/0428 713/166 |
| 2010/0311402 A1* | 12/2010 | Srinivasan | H04W 8/183 455/418 |
| 2010/0311418 A1* | 12/2010 | Shi | H04W 4/003 455/432.1 |
| 2011/0243553 A1* | 10/2011 | Russell | G06Q 30/0631 398/25 |
| 2012/0172089 A1* | 7/2012 | Bae | H04L 63/067 455/558 |
| 2013/0083783 A1 | 4/2013 | Gupta et al. | |
| 2013/0242783 A1* | 9/2013 | Horn | H04W 24/10 370/252 |
| 2014/0204904 A1 | 7/2014 | Xiang et al. | |
| 2014/0254491 A1* | 9/2014 | Lindholm | H04L 65/1016 370/328 |
| 2014/0334446 A1* | 11/2014 | Lim | H04W 48/20 370/331 |
| 2015/0004967 A1* | 1/2015 | Jiang | H04W 8/06 455/433 |
| 2015/0172993 A1* | 6/2015 | Jiang | H04W 40/20 455/406 |
| 2015/0188843 A1* | 7/2015 | Chauhan | H04L 47/801 709/225 |
| 2015/0264587 A1* | 9/2015 | Fischer | H04W 92/02 455/418 |
| 2015/0351034 A1 | 12/2015 | Lin et al. | |
| 2016/0088461 A1* | 3/2016 | Jiang | H04M 3/4878 455/432.1 |
| 2016/0269891 A1* | 9/2016 | Chen | H04W 12/00 |
| 2016/0295544 A1* | 10/2016 | Jiang | H04L 5/0053 |
| 2017/0118622 A1* | 4/2017 | Jiang | H04L 12/4641 |

FOREIGN PATENT DOCUMENTS

| | | |
|---|---|---|
| CN | 104023361 | 9/2014 |
| EP | 2945426 | 11/2015 |
| WO | WO 2014108056 | 7/2014 |
| WO | WO 2014121512 | 8/2014 |
| WO | WO 2014148860 | 9/2014 |

OTHER PUBLICATIONS

European Search Report, dated Sep. 15, 2017, in European Application No. 14903400.1 (9 pp.).

* cited by examiner

OFFLOADING METHOD AND APPARATUS

CROSS-REFERENCE TO RELATED APPLICATIONS

This application is a continuation of International Application No. PCT/CN2014/087782, filed on Sep. 29, 2014, the disclosure of which is hereby incorporated by reference in its entirety.

TECHNICAL FIELD

The present disclosure relates to the field of communications technologies, and in particular, to an offloading method and an apparatus.

BACKGROUND

With growth of user requirements and development of communications technologies, types of wireless communications technologies and related networks are increasing, for example, 2G, 3G, and 4G mobile communications technologies and networks that can provide wide coverage, and a Wireless Fidelity (WiFi) technology and a wireless local area network (WLAN) that can provide hotspot coverage. Therefore, a large quantity of scenarios in which different communications networks coexist have emerged, for example, a scenario in which 2G, 3G, and 4G networks and a WLAN coexist.

An evolved packet system (EPS) system is a system that supports multiple access technologies and mobility between multiple access networks. In a multi-access scenario, a terminal may be in common coverage of multiple 3rd Generation Partnership Project (3GPP) and/or non-3GPP access networks. These access networks may use different access technologies, may belong to different operators, and may provide access to different core networks. FIG. 1 shows a scenario in which Universal Mobile Telecommunications System (UMTS)/Long Term Evolution (LTE) and WLAN networks coexist. In a coverage area of a base station of the UMTS/LTE (a Node B in the UMTS and an eNB in the LTE), multiple WLAN access point (AP) exist. Compared with a base station, coverage area of an access point is relatively small.

In the foregoing scenario, a network architecture for interoperation between the UMTS/LTE and the WLAN has already been supported. In the architecture, interoperation is implemented based on an S2c interface between a packet data network (PDN) Gateway and UE. In the prior art, the interoperation between the UMTS/LTE and the WLAN is implemented by using a terminal-based (UE based) solution.

With rapid development of intelligent terminals and mobile applications, mobile data traffic is increasing sharply, so that a current network is hardly to meet a requirement of increasing data traffic. Therefore, to alleviate traffic load of a current 3GPP network, mobile operators hope to use a non-3GPP network to carry a part of traffic of the 3GPP network.

Currently, when handover is performed on a terminal, after the handover, a destination base station selects, from APs under the destination base station, a destination AP that can perform service offloading, and sends information about the destination AP to the terminal. After the handover is performed on the terminal, a service of the terminal under a source base station is interrupted. Therefore, the terminal can access the destination AP and recover the service only after the destination base station sends the information about the destination AP to the terminal, and a service interruption period is relatively long. Consequently, service continuity is relatively poor, and service quality is relatively poor.

SUMMARY

Embodiments of the present invention provide an offloading method and an apparatus, so as to resolve problems that existing service continuity is relatively poor and existing service quality is relatively poor.

According to a first aspect, an offloading method is provided, including:

determining, by a source cellular network node, that a terminal needs to hand over from the source cellular network node to a destination cellular network node;

sending, by the source cellular network node, a handover request to the destination cellular network node, where the handover request is used to obtain configuration information of a WLAN AP managed by the destination cellular network node, and the WLAN AP has an attribute of receiving data sent by a cellular network radio access device or sending data to the cellular network radio access device;

receiving, by the source cellular network node, the configuration information that is of the WLAN AP managed by the destination cellular network node and that is fed back by the destination cellular network node; and sending, by the source cellular network node and to the terminal, the configuration information of the WLAN AP managed by the destination cellular network node, so that the terminal selects a destination WLAN AP according to the configuration information of the WLAN AP managed by the destination cellular network node; and offloading data of the destination cellular network node to the destination WLAN AP.

With reference to the first aspect, in a first possible implementation manner, after the sending, by the source cellular network node and to the terminal, the configuration information of the WLAN AP managed by the destination cellular network node, the method further includes:

after determining that the terminal has handed over from the source cellular network node to the destination cellular network node, sending, by the source cellular network node, a release instruction message to the terminal, where the release instruction message is used to instruct the terminal to release configuration information of a WLAN AP managed by the source cellular network node.

With reference to the first aspect or the first possible implementation manner of the first aspect, in a second possible implementation manner, before the determining, by a source cellular network node, that a terminal needs to hand over from the source cellular network node to a destination cellular network node, the method further includes:

obtaining, by the source cellular network node, the configuration information reported by the WLAN AP managed by the source cellular network node; and delivering, by the source cellular network node and to the terminal, the configuration information reported by the WLAN AP managed by the source cellular network node.

With reference to the second possible implementation manner of the first aspect, in a third possible implementation manner, the obtaining, by the source cellular network node, the configuration information reported by the WLAN AP managed by the source cellular network node includes:

obtaining, by the source cellular network node, the configuration information that is reported by the WLAN AP by using an interface, where the WLAN AP is managed by the source cellular network node.

With reference to the second or the third possible implementation manner of the first aspect, in a fourth possible implementation manner, the delivering, by the source cellular network node and to the terminal, the configuration information reported by the WLAN AP managed by the source cellular network node includes:

delivering, by the source cellular network node by using a radio resource control RRC reconfiguration message or a broadcast message and to the terminal, the configuration information reported by the WLAN AP managed by the source cellular network node.

With reference to any one of the first to the fourth possible implementation manners of the first aspect, in a fifth possible implementation manner, the method further includes:

if a WLAN AP managed by the source cellular network node is added, delivering, by the source cellular network node, obtained configuration information of the added WLAN AP to the terminal; or if the configuration information of the WLAN AP managed by the source cellular network node is changed, delivering, by the source cellular network node and to the terminal, changed configuration information that is obtained and that is of a WLAN AP whose corresponding configuration information is changed.

With reference to any one of the first to the fifth possible implementation manners of the first aspect, in a sixth possible implementation manner, the method further includes:

obtaining, by the source cellular network node, measurement information, and determining, according to the measurement information, a to-be-activated WLAN AP from WLAN APs managed by the source cellular network node; and sending, by the source cellular network node and to the terminal, an activation instruction that carries an identifier of the to-be-activated WLAN AP, so that the terminal activates the to-be-activated WLAN AP.

With reference to any one of the first to the fifth possible implementation manners of the first aspect, in a seventh possible implementation manner, before the delivering, by the source cellular network node and to the terminal, the configuration information reported by the WLAN AP managed by the source cellular network node, the method further includes:

obtaining, by the source cellular network node, measurement information; and determining, by the source cellular network node according to the measurement information, a to-be-activated WLAN AP from WLAN APs managed by the source cellular network node; where the delivering, by the source cellular network node and to the terminal, the configuration information reported by the WLAN AP managed by the source cellular network node includes:

delivering, by the source cellular network node, the configuration information and the identifier of the to-be-activated WLAN AP to the terminal.

With reference to the sixth possible implementation manner of the first aspect, in an eighth possible implementation manner, the sending, by the source cellular network node and to the terminal, an activation instruction that carries an identifier of the to-be-activated WLAN AP includes:

sending, by the source cellular network node by using an RRC reconfiguration message, a medium access control MAC control element message, or a scheduling control physical downlink control channel PDCCH message and to the terminal, the activation instruction that carries the identifier of the to-be-activated WLAN With reference to the sixth to the eighth possible implementation manners of the first aspect, in a ninth possible implementation manner, the measurement information includes first measurement information of the source cellular network node, second measurement information of the WLAN AP managed by the source cellular network node, and third measurement information of the terminal.

With reference to any one of the first aspect, or the first to the ninth possible implementation manners of the first aspect, in a tenth possible implementation manner, configuration information of any WLAN AP in the WLAN APs includes one or any combination of the following:

basic service set identifier BSSID information, MAC address information, service set identifier SSID information, frequency information, bandwidth information, or channel information.

With reference to any one of the first aspect, or the first to the tenth possible implementation manners of the first aspect, in an eleventh possible implementation manner, the source cellular network node is any one of a base station, a single RAN coordinator SRC, or an access controller AC; and the destination cellular network node is any one of a base station, an SRC, or an AC.

According to a second aspect, an offloading method is provided, including:

receiving, by a terminal, configuration information that is of a WLAN AP managed by a destination cellular network node and that is obtained by a source cellular network node, where the WLAN AP has an attribute of receiving data sent by a cellular network radio access device or sending data to the cellular network radio access device;

selecting, by the terminal according to the configuration information of the WLAN AP managed by the destination cellular network node, a destination WLAN AP; and offloading, by the terminal, data of the destination cellular network node to the destination WLAN AP.

With reference to the second aspect, in a first possible implementation manner, after the offloading, by the terminal, data of the destination cellular network node to the destination WLAN AP, the method further includes:

receiving, by the terminal, a release instruction message sent by the source cellular network node; and releasing, by the terminal, configuration information of a WLAN AP managed by the source cellular network node.

With reference to the second aspect or the first possible implementation manner of the second aspect, in a second possible implementation manner, before the receiving, by a terminal, configuration information that is of a WLAN AP managed by a destination cellular network node and that is obtained by a source cellular network node, the method further includes:

receiving, by the terminal, the configuration information that is of the WLAN AP managed by the source cellular network node and that is sent by the source cellular network node; and performing, by the terminal, configuration according to the configuration information of the WLAN AP managed by the source cellular network node.

With reference to the second possible implementation manner of the second aspect, in a third possible implementation manner, the receiving, by the terminal, the configuration information that is of the WLAN AP managed by the source cellular network node and that is sent by the source cellular network node includes:

receiving, by the terminal, the configuration information that is of the WLAN AP managed by the source cellular network node and that is sent by the source cellular network node by using a radio resource control RRC reconfiguration message or a broadcast message.

With reference to the second or the third possible implementation manner of the second aspect, in a fourth possible implementation manner, before the receiving, by the terminal, the configuration information that is of the WLAN AP managed by the source cellular network node and that is sent by the source cellular network node, the method further includes:

receiving, by the terminal, configuration information of an additional WLAN AP managed by the source cellular network node; or receiving, by the terminal, changed configuration information of a WLAN AP whose corresponding configuration information is changed, where the WLAN AP is managed by the source cellular network node.

With reference to any one of the second to the fourth possible implementation manners of the second aspect, in a fifth possible implementation manner, after the receiving, by the terminal, the configuration information that is of the WLAN AP managed by the source cellular network node and that is sent by the source cellular network node, the method further includes:

receiving, by the terminal, an identifier that is of the to-be-activated WLAN AP and that is sent by the source cellular network node; and activating, by the terminal, the to-be-activated WLAN AP according to the identifier of the to-be-activated WLAN AP.

With reference to the fifth possible implementation manner of the second aspect, in a sixth possible implementation manner, the receiving, by the terminal, an identifier that is of the to-be-activated WLAN AP and that is sent by the source cellular network node includes:

receiving, by the terminal, an activation instruction that carries the identifier of the to-be-activated WLAN AP and that is sent by the source cellular network node.

With reference to the sixth possible implementation manner of the second aspect, in a seventh possible implementation manner, the receiving, by the terminal, an activation instruction that carries the identifier of the to-be-activated WLAN AP and that is sent by the source cellular network node includes:

receiving, by the terminal, the activation instruction that carries the identifier of the to-be-activated WLAN AP and that is sent by the source cellular network node by using an RRC reconfiguration message, a medium access control MAC control element message, or a scheduling control physical downlink control channel PDCCH message.

With reference to any one of the second aspect, or the first to the seventh possible implementation manners of the second aspect, in an eighth possible implementation manner, configuration information of the WLAN AP includes one or any combination of the following:

basic service set identifier BSSID information, MAC address information, service set identifier SSID information, frequency information, bandwidth information, or channel information.

With reference to any one of the second aspect, or the first to the eighth possible implementation manners of the second aspect, in a ninth possible implementation manner, the source cellular network node is any one of a base station, a single RAN coordinator SRC, or an access controller AC; and the destination cellular network node is any one of a base station, an SRC, or an AC.

According to a third aspect, an offloading method is provided, including:

receiving, by a destination cellular network node, a handover request that is sent by a source cellular network node and that is used to request a handover of a terminal from the source cellular network node to the destination cellular network node, where the handover request is used to obtain configuration information of a WLAN AP managed by the destination cellular network node, and the WLAN AP has an attribute of receiving data sent by a cellular network radio access device or sending data to the cellular network radio access device; and sending, by the destination cellular network node by using the source cellular network node and to the terminal, the configuration information of the WLAN AP managed by the destination cellular network node, so that the terminal selects a destination WLAN AP according to the configuration information of the WLAN AP; and offloading data of the destination cellular network node to the destination WLAN AP.

With reference to the third aspect, in a first possible implementation manner, configuration information of any WLAN AP in the WLAN APs includes one or any combination of the following:

basic service set identifier BSSID information, medium access control MAC address information, service set identifier SSID information, frequency information, bandwidth information, or channel information.

With reference to the third aspect or the first possible implementation manner of the third aspect, in a second possible implementation manner, the source cellular network node is any one of a base station, a single RAN coordinator SRC, or an access controller AC; and the destination cellular network node is any one of a base station, an SRC, or an AC.

According to a fourth aspect, a source cellular network node is provided, including:

a determining unit, configured to determine that a terminal needs to hand over from the source cellular network node to a destination cellular network node;

a sending unit, configured to send a handover request to the destination cellular network node, where the handover request is used to obtain configuration information of a WLAN AP managed by the destination cellular network node, and the WLAN AP has an attribute of receiving data sent by a cellular network radio access device or sending data to the cellular network radio access device; and a receiving unit, configured to receive the configuration information that is of the WLAN AP managed by the destination cellular network node and that is fed back by the destination cellular network node; where the sending unit is further configured to send, to the terminal, the configuration information of the WLAN AP managed by the destination cellular network node, so that the terminal selects a destination WLAN AP according to the configuration information of the WLAN AP managed by the destination cellular network node, and offloads data of the destination cellular network node to the destination WLAN With reference to the fourth aspect, in a first possible implementation manner, the sending unit is further configured to send a release instruction message to the terminal, where the release instruction message is used to instruct the terminal to release configuration information of a WLAN AP managed by the source cellular network node.

With reference to the fourth aspect or the first possible implementation manner of the fourth aspect, in a second possible implementation manner, the receiving unit is further configured to obtain the configuration information reported by the WLAN AP managed by the source cellular network node; and the sending unit is further configured to deliver, to the terminal, the configuration information reported by the WLAN AP managed by the source cellular network node.

With reference to the second possible implementation manner of the fourth aspect, in a third possible implementation manner, the receiving unit is configured to:

obtain the configuration information that is reported by the WLAN AP by using an interface, where the WLAN AP is managed by the source cellular network node.

With reference to the second or the third possible implementation manner of the fourth aspect, in a fourth possible implementation manner, the sending unit is configured to:

deliver, by using a radio resource control RRC reconfiguration message or a broadcast message and to the terminal, the configuration information reported by the WLAN AP managed by the source cellular network node.

With reference to any one of the first to the fourth possible implementation manners of the fourth aspect, in a fifth possible implementation manner, if a WLAN AP managed by the source cellular network node is added, the sending unit is further configured to:

deliver obtained configuration information of the added WLAN AP to the terminal; or if the configuration information of the WLAN AP managed by the source cellular network node is changed, the sending unit is further configured to:

deliver, to the terminal, changed configuration information that is obtained and that is of a WLAN AP whose corresponding configuration information is changed.

With reference to any one of the first to the fifth possible implementation manners of the fourth aspect, in a sixth possible implementation manner, the receiving unit is further configured to:

obtain measurement information, and determine, according to the measurement information, a to-be-activated WLAN AP from WLAN APs managed by the source cellular network node; and the sending unit is further configured to:

send, to the terminal, an activation instruction that carries an identifier of the to-be-activated WLAN AP, so that the terminal activates the to-be-activated WLAN AP.

With reference to any one of the first to the fifth possible implementation manners of the fourth aspect, in a seventh possible implementation manner, the receiving unit is further configured to:

obtain measurement information, and determine, according to the measurement information, a to-be-activated WLAN AP from WLAN APs managed by the source cellular network node; and the sending unit is further configured to:

deliver the configuration information and the identifier of the to-be-activated WLAN AP to the terminal.

With reference to the sixth possible implementation manner of the fourth aspect, in an eighth possible implementation manner, the sending unit is further configured to:

send, by using an RRC reconfiguration message, a medium access control MAC control element message, or a scheduling control physical downlink control channel PDCCH message and to the terminal, the activation instruction that carries the identifier of the to-be-activated WLAN AP.

With reference to the sixth to the eighth possible implementation manners of the fourth aspect, in a ninth possible implementation manner, the measurement information includes first measurement information of the source cellular network node, second measurement information of the WLAN AP managed by the source cellular network node, and third measurement information of the terminal.

With reference to any one of the fourth aspect, or the first to the ninth possible implementation manners of the fourth aspect, in a tenth possible implementation manner, configuration information of any WLAN AP in the WLAN APs includes one or any combination of the following:

basic service set identifier BSSID information, MAC address information, service set identifier SSID information, frequency information, bandwidth information, or channel information.

With reference to any one of the fourth aspect, or the first to the tenth possible implementation manners of the fourth aspect, in an eleventh possible implementation manner, the source cellular network node is any one of a base station, a single RAN coordinator SRC, or an access controller AC; and the destination cellular network node is any one of a base station, an SRC, or an AC.

According to a fifth aspect, a terminal is provided, including:

a receiving unit, configured to receive configuration information that is of a WLAN AP managed by a destination cellular network node and that is obtained by a source cellular network node, where the WLAN AP has an attribute of receiving data sent by a cellular network radio access device or sending data to the cellular network radio access device;

a selection unit, configured to select a destination WLAN AP according to the configuration information of the WLAN AP managed by the destination cellular network node; and an offloading unit, configured to offload data of the destination cellular network node to the destination WLAN AP.

With reference to the fifth aspect, in a first possible implementation manner, the receiving unit is further configured to:

receive a release instruction message sent by the source cellular network node; and the terminal further includes: a release unit, configured to release configuration information of a WLAN AP managed by the source cellular network node.

With reference to the fifth aspect or the first possible implementation manner of the fifth aspect, in a second possible implementation manner, the receiving unit is further configured to:

receive the configuration information that is of the WLAN AP managed by the source cellular network node and that is sent by the source cellular network node; and the offloading unit is further configured to:

perform configuration according to the configuration information of the WLAN AP managed by the source cellular network node.

With reference to the second possible implementation manner of the fifth aspect, in a third possible implementation manner, the receiving unit is configured to:

receive the configuration information that is of the WLAN AP managed by the source cellular network node and that is sent by the source cellular network node by using a radio resource control RRC reconfiguration message or a broadcast message.

With reference to the second or the third possible implementation manner of the fifth aspect, in a fourth possible implementation manner, the receiving unit is further configured to:

receive configuration information of an additional WLAN AP managed by the source cellular network node; or receive changed configuration information of a WLAN AP whose corresponding configuration information is changed, where the WLAN AP is managed by the source cellular network node.

With reference to any one of the second to the fourth possible implementation manners of the fifth aspect, in a fifth possible implementation manner, the receiving unit is further configured to:

receive an identifier that is of the to-be-activated WLAN AP and that is sent by the source cellular network node; and the terminal further includes: an activation unit, configured to activate, the to-be-activated WLAN AP according to the identifier of the to-be-activated WLAN AP.

With reference to the fifth possible implementation manner of the fifth aspect, in a sixth possible implementation manner, the receiving unit is further configured to:

receive an activation instruction that carries the identifier of the to-be-activated WLAN AP and that is sent by the source cellular network node.

With reference to the sixth possible implementation manner of the fifth aspect, in a seventh possible implementation manner, the receiving unit is configured to:

receive the activation instruction that carries the identifier of the to-be-activated WLAN AP and that is sent by the source cellular network node by using an RRC reconfiguration message, a medium access control MAC control element message, or a scheduling control physical downlink control channel PDCCH message.

With reference to any one of the fifth aspect, or the first to the seventh possible implementation manners of the fifth aspect, in an eighth possible implementation manner, configuration information of the WLAN AP includes one or any combination of the following:

basic service set identifier BSSID information, MAC address information, service set identifier SSID information, frequency information, bandwidth information, or channel information.

With reference to any one of the fifth aspect, or the first to the eighth possible implementation manners of the fifth aspect, in a ninth possible implementation manner, the source cellular network node is any one of a base station, a single RAN coordinator SRC, or an access controller AC; and the destination cellular network node is any one of a base station, an SRC, or an AC.

According to a sixth aspect, a destination cellular network node is provided, including:

a receiving unit, configured to receive a handover request that is sent by a source cellular network node and that is used to request a handover of a terminal from the source cellular network node to the destination cellular network node, where the handover request is used to obtain configuration information of a WLAN AP managed by the destination cellular network node, and the WLAN AP has an attribute of receiving data sent by a cellular network radio access device or sending data to the cellular network radio access device; and a sending unit, configured to send, by using the source cellular network node and to the terminal, the configuration information of the WLAN AP managed by the destination cellular network node, so that the terminal selects a destination WLAN AP according to the configuration information of the WLAN AP, and offloads data of the destination cellular network node to the destination WLAN AP.

With reference to the sixth aspect, in a first possible implementation manner, configuration information of any WLAN AP in the WLAN APs includes one or any combination of the following:

basic service set identifier BSSID information, medium access control MAC address information, service set identifier SSID information, frequency information, bandwidth information, or channel information.

With reference to the sixth aspect or the first possible implementation manner of the sixth aspect, in a second possible implementation manner, the source cellular network node is any one of a base station, a single RAN coordinator SRC, or an access controller AC; and the destination cellular network node is any one of a base station, an SRC, or an AC.

In solutions provided in embodiments of the present invention, when a terminal is in a handover process, a destination cellular network node sends, to the terminal, configuration information of a WLAN AP managed by the destination cellular network node; and then the terminal selects a destination WLAN AP from WLAN APs managed by the destination cellular network node, and offloads data of the destination cellular network node to the destination WLAN AP. Therefore, the destination WLAN AP selected by the destination cellular network node can be received before a handover is completed, thereby ensuring service continuity and improving service quality of a terminal.

DESCRIPTION OF EMBODIMENTS

To make the objectives, technical solutions, and advantages of the embodiments of the present invention clearer, the following clearly describes the technical solutions in the embodiments of the present invention with reference to the accompanying drawings in the embodiments of the present invention. Apparently, the8 described embodiments are some but not all of the embodiments of the present invention. All other embodiments obtained by persons of ordinary skill in the art based on the embodiments of the present invention without creative efforts shall fall within the protection scope of the present invention.

In addition, the terms "system" and "network" may be used interchangeably in this specification. The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

In the following, implementation manners of the present invention are described in detail with reference to the accompanying drawings. It should be understood that the preferred embodiments described herein are merely used to illustrate and explain the present invention, but are not intended to limit the present invention. In addition, the embodiments of the present application and features in the embodiments may be mutually combined if they do not conflict with each other.

The wireless access network described in this specification may be various wireless communications systems, for example: a current 2G or 3G communications system or a next-generation communications system, such as a Global System for Mobile Communications (GSM), a Code Division Multiple Access (CDMA) system, a Time Division Multiple Access (TDMA) system, a Wideband Code Division Multiple Access (WCDMA) system, an Frequency Division Multiple Access (FDMA) system, an Orthogonal Frequency-Division Multiple Access (OFDMA) system, a single carrier FDMA (SC-FDMA) system, or a general packet radio service (GPRS) system; an LTE system; or another similar communications system. A non-3GPP wireless access network may be (Worldwide Interoperability for Microwave Access (WIMAX), that is, Worldwide Interoperability for Microwave Access; WIFI, that is, Wireless Fidelity; and a wireless local area network that includes an AP and a wireless network interface card, and a WLAN technology is also referred to as WIFI.

In the following, the preferred implementation manners of the present invention are described in detail with reference to the accompanying drawings.

Figure 1:
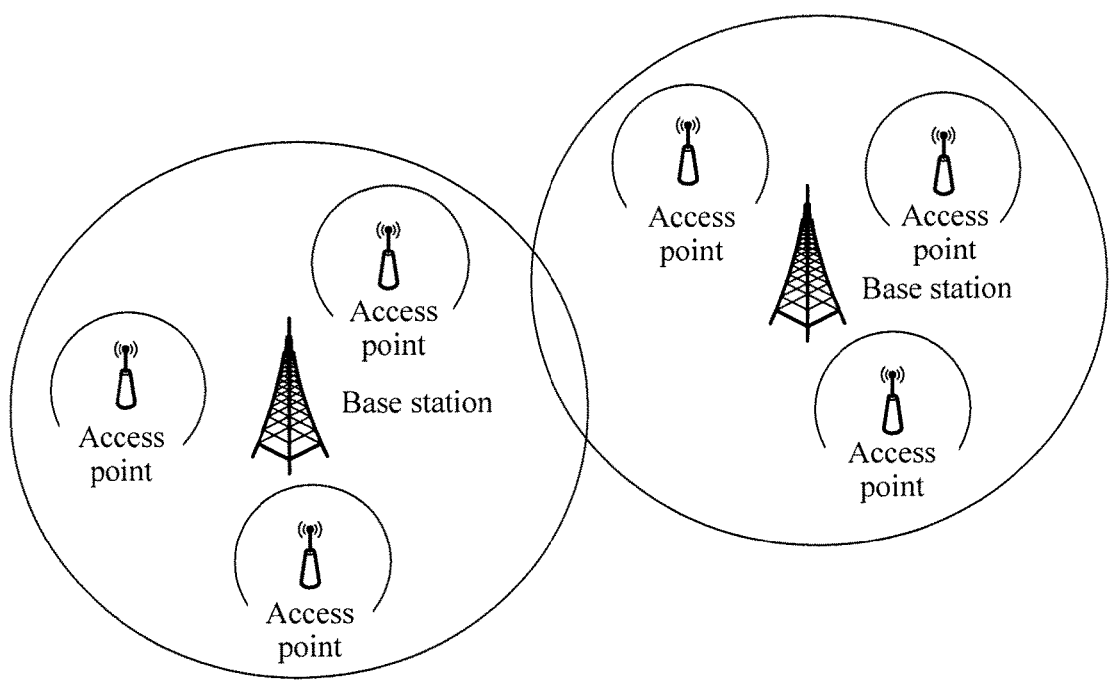
FIG. 1 is a schematic diagram of a scenario in which UMTS/LTE and WLAN networks coexist in the prior art.
Figure 2:
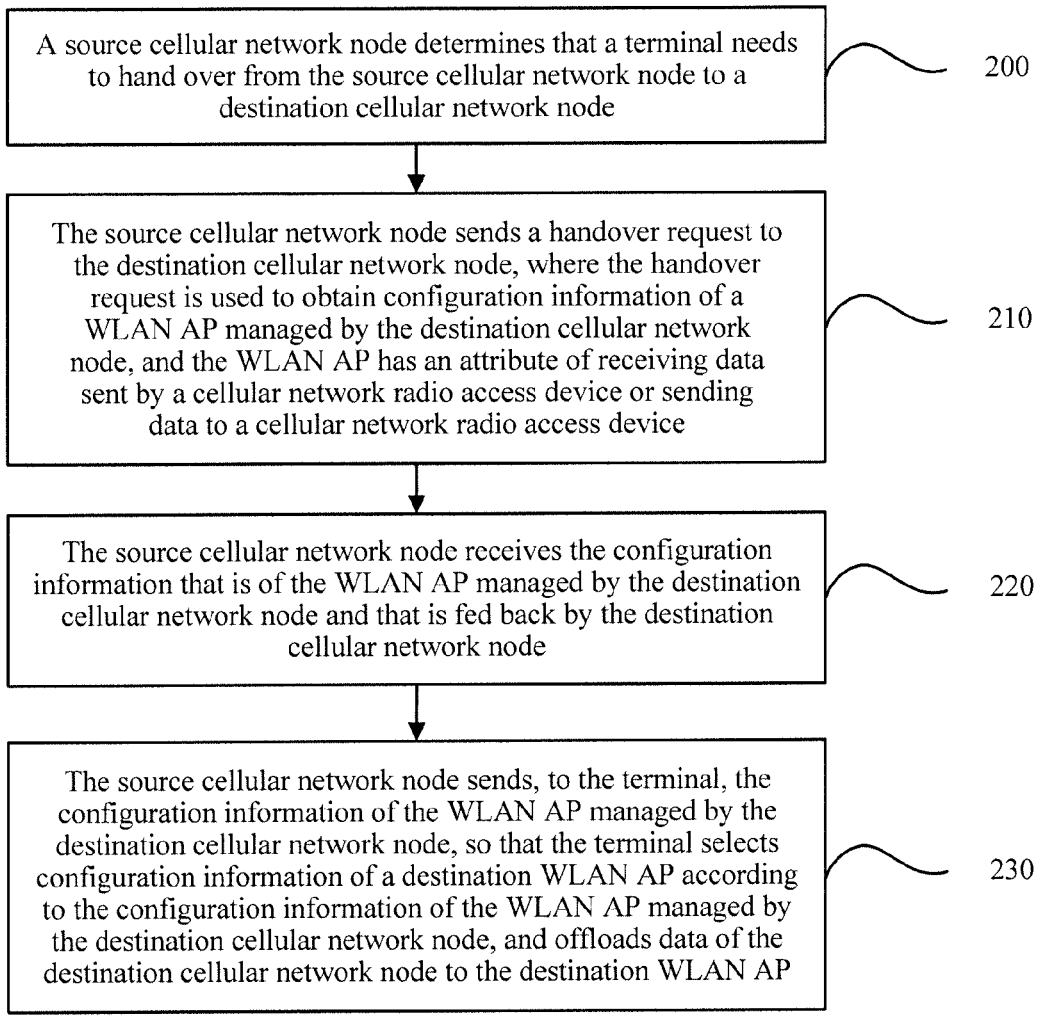
FIG. 2 is a method flowchart of an offloading method according to an embodiment of the present invention.

Referring to FIG. 2, in an embodiment of the present invention, a detailed offloading process is as follows:

Step 200: A source cellular network node determines that a terminal needs to hand over from the source cellular network node to a destination cellular network node.

Step 210: The source cellular network node sends a handover request to the destination cellular network node, where the handover request is used to obtain configuration information of a WLAN AP managed by the destination cellular network node, and the WLAN AP has an attribute of receiving data sent by a cellular network radio access device or sending data to a cellular network radio access device.

Step 220: The source cellular network node receives the configuration information that is of the WLAN AP managed by the destination cellular network node and that is fed back by the destination cellular network node.

Step 230: The source cellular network node sends, to the terminal, the configuration information of the WLAN AP managed by the destination cellular network node, so that the terminal selects a destination WLAN AP according to the configuration information of the WLAN AP managed by the destination cellular network node, and offloads data of the destination cellular network node to the destination WLAN AP.

In this embodiment of the present invention, further, after the source cellular network node sends, to the terminal, the configuration information of the WLAN AP managed by the destination cellular network node, the method further includes the following operation:

after determining that the terminal has handed over from the source cellular network node to the destination cellular network node, sending, by the source cellular network node, a release instruction message to the terminal, where the release instruction message is used to instruct the terminal to release configuration information of a WLAN AP managed by the source cellular network node.

In this embodiment of the present invention, further, before the source cellular network node determines that the terminal needs to hand over from the source cellular network node to the destination cellular network node, the method further includes the following operations:

obtaining, by the source cellular network node, the configuration information reported by the WLAN AP managed by the source cellular network node; and delivering, by the source cellular network node and to the terminal, the configuration information reported by the WLAN AP managed by the source cellular network node.

In this embodiment of the present invention, the source cellular network node may obtain, in multiple manners, the configuration information reported by the WLAN AP managed by the source cellular network node. Optionally, the following manner may be used:

obtaining, by the source cellular network node, the configuration information that is reported by the WLAN AP by using an interface, where the WLAN AP is managed by the source cellular network node.

Optionally, the interface is an interface-Z interface.

In this embodiment of the present invention, the source cellular network node may deliver, in multiple manners and to the terminal, the configuration information reported by the WLAN AP managed by the source cellular network node. Optionally, the following manner may be used:

delivering, by the source cellular network node by using an RRC (Radio Resource Control, radio resource control) reconfiguration message or a broadcast message and to the terminal, the configuration information reported by the WLAN AP managed by the source cellular network node.

Certainly, in a practical application, there is another manner, and details are not described herein.

In this embodiment of the present invention, configuration information may be delivered to the terminal in a form of a list. In this manner, the list may include only configuration information of all WLAN APs, or may include configuration information of all WLAN APs and index numbers corresponding to all the WLAN APs.

In this embodiment of the present invention, an additional WLAN AP may be managed by the source cellular network node, or configuration information of a WLAN AP that is currently managed by a first node may be changed; therefore the method provided in this embodiment of the present invention further includes the following operation:

if a WLAN AP managed by the source cellular network node is added, delivering, by the source cellular network node, obtained configuration information of the added WLAN AP to the terminal; or if the configuration information of the WLAN AP managed by the source cellular network node is changed, delivering, by the source cellular network node and to the terminal, changed configuration information that is obtained and that is of a WLAN AP whose corresponding configuration information is changed.

In this embodiment of the present invention, further, the method further includes the following operations:

obtaining, by the source cellular network node, measurement information, and determining, according to the measurement information, a to-be-activated WLAN AP from WLAN APs managed by the source cellular network node; and sending, by the source cellular network node and to the terminal, an activation instruction that carries an identifier of the to-be-activated WLAN AP, so that the terminal activates the to-be-activated WLAN AP.

The foregoing process is a process in which measurement information is obtained after the configuration information is sent to a terminal. In this embodiment of the present invention, when the source cellular network node obtains the configuration information, the measurement information is obtained, and both the measurement information and the configuration information are delivered to the terminal. Optionally, a process is as follows:

obtaining, by the source cellular network node, measurement information; and determining, by the source cellular network node according to the measurement information, a to-be-activated WLAN AP from WLAN APs managed by the source cellular network node.

In this case, that the source cellular network node delivers, to the terminal, the configuration information reported by the WLAN AP managed by the source cellular network node is:

delivering, by the source cellular network node, the configuration information and the identifier of the to-be-activated WLAN AP to the terminal.

Optionally, the measurement information is key performance indicator (KPI) measurement information.

In this embodiment of the present invention, the source cellular network node may send, in multiple manners and to the terminal, the activation instruction that carries the identifier of the to-be-activated WLAN AP. Optionally, the following manner may be used:

sending, by the source cellular network node by using an RRC reconfiguration message, a medium access control (MAC) control element message, or a scheduling control physical downlink control channel (PDCCH) message and to the terminal, the activation instruction that carries the identifier of the to-be-activated WLAN AP.

In this embodiment of the present invention, after the terminal receives the activation instruction and accesses a WLAN AP, to improve security of data transmission, the terminal proactively performs scanning and key authentication on the accessed WLAN AP and completes association with the accessed WLAN AP. Optionally, if the terminal has accessed the WLAN AP, the WLAN AP is directly activated. In this embodiment of the present invention, after the terminal activates the WLAN AP, the terminal can receive and send data by using this WLAN AP.

In this embodiment of the present invention, optionally, the KPI measurement information includes one or any combination of first KPI performance measurement information of the source cellular network node, second KPI performance measurement information of a WLAN AP, or third KPI performance measurement information of the terminal.

The first KPI performance measurement information includes load information, an access success rate, a handover success rate, a call drop rate, and the like.

The second KPI performance measurement information of the WLAN AP includes: a channel busy rate, a quantity of associated users, a remaining backhaul capacity, a remaining DHCP (Dynamic Host Configuration Protocol, Dynamic Host Configuration Protocol) resource, a remaining DNS (Domain Name System, domain name system) resource, a service-specific association success rate, a service-specific a re-association success rate, a packet loss rate, an average transmission delay, strength and interference of a WLAN downlink signal, a WLAN rate limit, allowed WLAN access duration, a movement state of a terminal, and the like.

The third KPI performance measurement information includes: an reference signal received power (RSRP), an reference signal received quality (RSRQ), and a channel quality indicator (CQI), and the like.

In this embodiment of the present invention, optionally, configuration information of any WLAN AP in WLAN APs includes one or any combination of the following:

Basic service set identifier (BSSID) information, MAC address information, service set identifier (SSID), frequency information, bandwidth information, or channel information.

In this embodiment of the present invention, optionally, the source cellular network node may be any one of a base station, an single RAN coordinator (SRC), or an access controller (AC).

Likewise, the destination cellular network node may also be any one of a base station, an SRC, or an AC.

In this embodiment of the present invention, a base station and an SRC may be two different entities, or a base station may integrate a function of an SRC.

When the base station and the SRC are two different entities, the SRC may obtain, by using an interface-Z interface, configuration information reported by a WLAN AP, and then the SRC sends, based on an X2 interface, the configuration information to the base station.

The base station described in this embodiment of the present invention may be an eNB or a NodeB, or may be a base station in another network, and details are not described herein.

Figure 3:
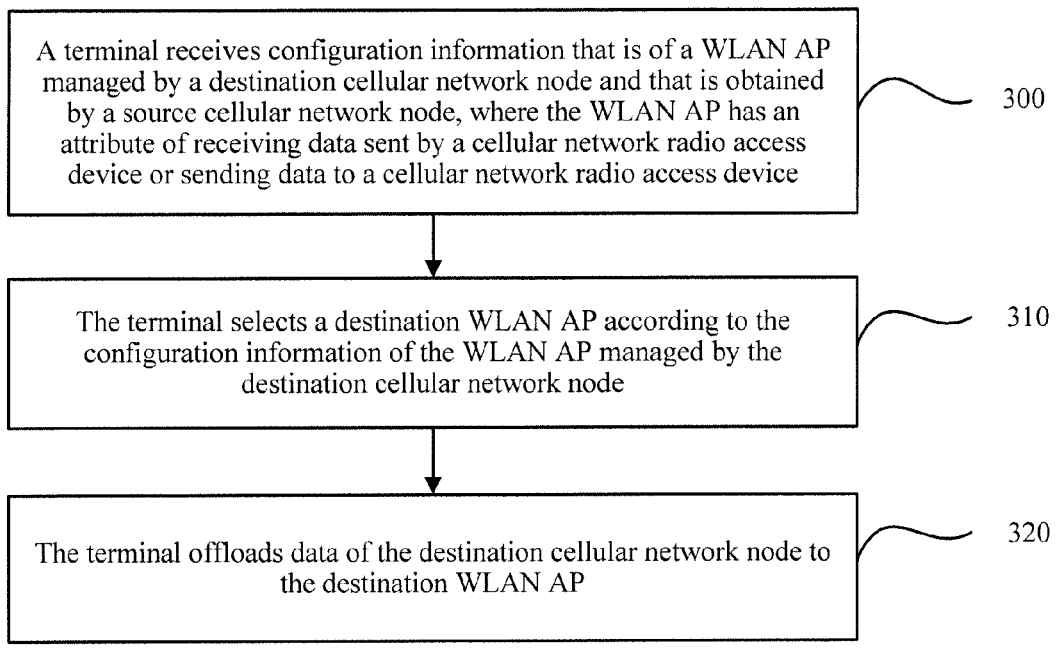
FIG. 3 is another method flowchart of an offloading method according to an embodiment of the present invention.

Referring to FIG. 3, in an embodiment of the present invention, another detailed offloading process is as follows:

Step 300: A terminal receives configuration information that is of a WLAN AP managed by a destination cellular network node and that is obtained by a source cellular network node, where the WLAN AP has an attribute of receiving data sent by a cellular network radio access device or sending data to a cellular network radio access device.

Step 310: The terminal selects a destination WLAN AP according to the configuration information of the WLAN AP managed by the destination cellular network node.

Step 320: The terminal offloads data of the destination cellular network node to the destination WLAN AP.

In this embodiment of the present invention, further, after the terminal offloads the data of the destination cellular network node to the destination WLAN AP, the method further includes the following operations:

receiving, by the terminal, a release instruction message sent by the source cellular network node; and releasing, by the terminal, configuration information of a WLAN AP managed by the source cellular network node.

In this embodiment of the present invention, before the terminal receives the configuration information that is of the WLAN AP managed by the destination cellular network node and that is obtained by the source cellular network node, the method further includes the following operations:

receiving, by the terminal, the configuration information that is of the WLAN AP managed by the source cellular network node and that is sent by the source cellular network node; and performing, by the terminal, configuration according to the configuration information of the WLAN AP managed by the source cellular network node.

In this embodiment of the present invention, the terminal may receive, in multiple manners, the configuration information that is of the WLAN AP managed by the source cellular network node and that is sent by the source cellular network node. Optionally, the following manner may be used:

receiving, by the terminal, the configuration information that is of the WLAN AP managed by the source cellular network node and that is sent by the source cellular network node by using a radio resource control RRC reconfiguration message or a broadcast message.

Further, in this embodiment of the present invention, the method further includes:

receiving, by the terminal, configuration information of an additional WLAN AP managed by the source cellular network node; or receiving, by the terminal, changed configuration information of a WLAN AP whose corresponding configuration information is changed, where the WLAN AP is managed by the source cellular network node.

In this embodiment of the present invention, further, after the terminal receives the configuration information that is of the WLAN AP managed by the source cellular network node and that is sent by the source cellular network node, the method further includes:

receiving, by the terminal, an identifier that is of a to-be-activated WLAN AP and that is sent by the source cellular network node; and activating, by the terminal, the to-be-activated WLAN AP according to the identifier of the to-be-activated WLAN AP.

In this embodiment of the present invention, the identifier of the to-be-activated WLAN AP may be obtained together with the configuration information; and a process in which the to-be-activated WLAN AP is activated may be performed after configuration is performed according to the configuration information reported by the WLAN AP, or the process may be performed when the configuration is being performed.

In this embodiment of the present invention, the terminal may receive, in multiple manners, the identifier that is of the to-be-activated WLAN AP and that is sent by the source cellular network node. Optionally, the following manner may be used:

receiving, by the terminal, an activation instruction that carries the identifier of the to-be-activated WLAN AP and that is sent by the source cellular network node.

In this embodiment of the present invention, the terminal may receive, in multiple manners, an activation instruction that carries the identifier of the to-be-activated WLAN AP and that is sent by the source cellular network node. Optionally, the following manner may be used:

receiving, by the terminal, the activation instruction that carries the identifier of the to-be-activated WLAN AP and that is sent by the source cellular network node by using an RRC reconfiguration message, a medium access control MAC control element message, or a scheduling control physical downlink control channel PDCCH.

In this embodiment of the present invention, optionally, configuration information reported by the WLAN AP includes one or any combination of the following:

BSSID information, MAC address information, SSID information, frequency information, bandwidth information, or channel information.

Optionally, in this embodiment of the present invention, the source cellular network node is any one of a base station, an SRC, or an AC; and the destination cellular network node is any one of a base station, an SRC, or an AC.

Figure 4:
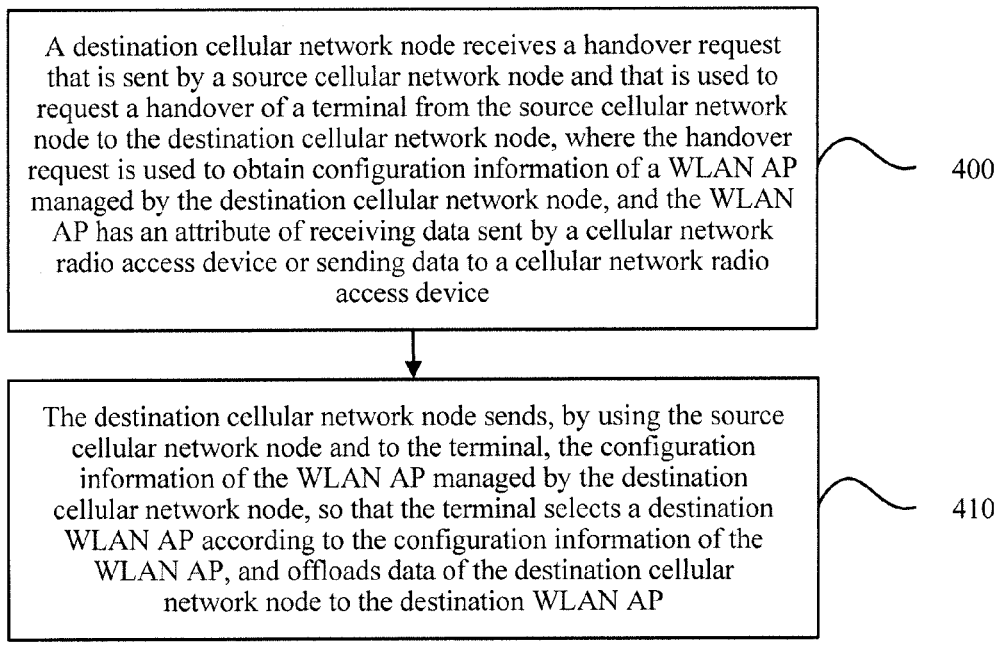
FIG. 4 is another method flowchart of an offloading method according to an embodiment of the present invention.

Referring to FIG. 4, in an embodiment of the present invention, another detailed offloading process is as follows:

Step 400: A destination cellular network node receives a handover request that is sent by a source cellular network node and that is used to request a handover of a terminal from the source cellular network node to the destination cellular network node, where the handover request is used to obtain configuration information of a WLAN AP managed by the destination cellular network node, and the WLAN AP has an attribute of receiving data sent by a cellular network radio access device or sending data to a cellular network radio access device.

Step 410: The destination cellular network node sends, by using the source cellular network node and to the terminal, the configuration information of the WLAN AP managed by the destination cellular network node, so that the terminal selects a destination WLAN AP according to the configuration information of the WLAN AP, and offloads data of the destination cellular network node to the destination WLAN AP.

In this embodiment of the present invention, optionally, configuration information of any WLAN AP in WLAN APs includes one or any combination of the following:

basic service set identifier BSSID information, medium access control MAC address information, service set identifier SSID information, frequency information, bandwidth information, or channel information.

In this embodiment of the present invention, optionally, the source cellular network node is any one of a base station, a single RAN coordinator SRC, or an access controller AC; and the destination cellular network node is any one of a base station, an SRC, or an AC.

Figure 5A:
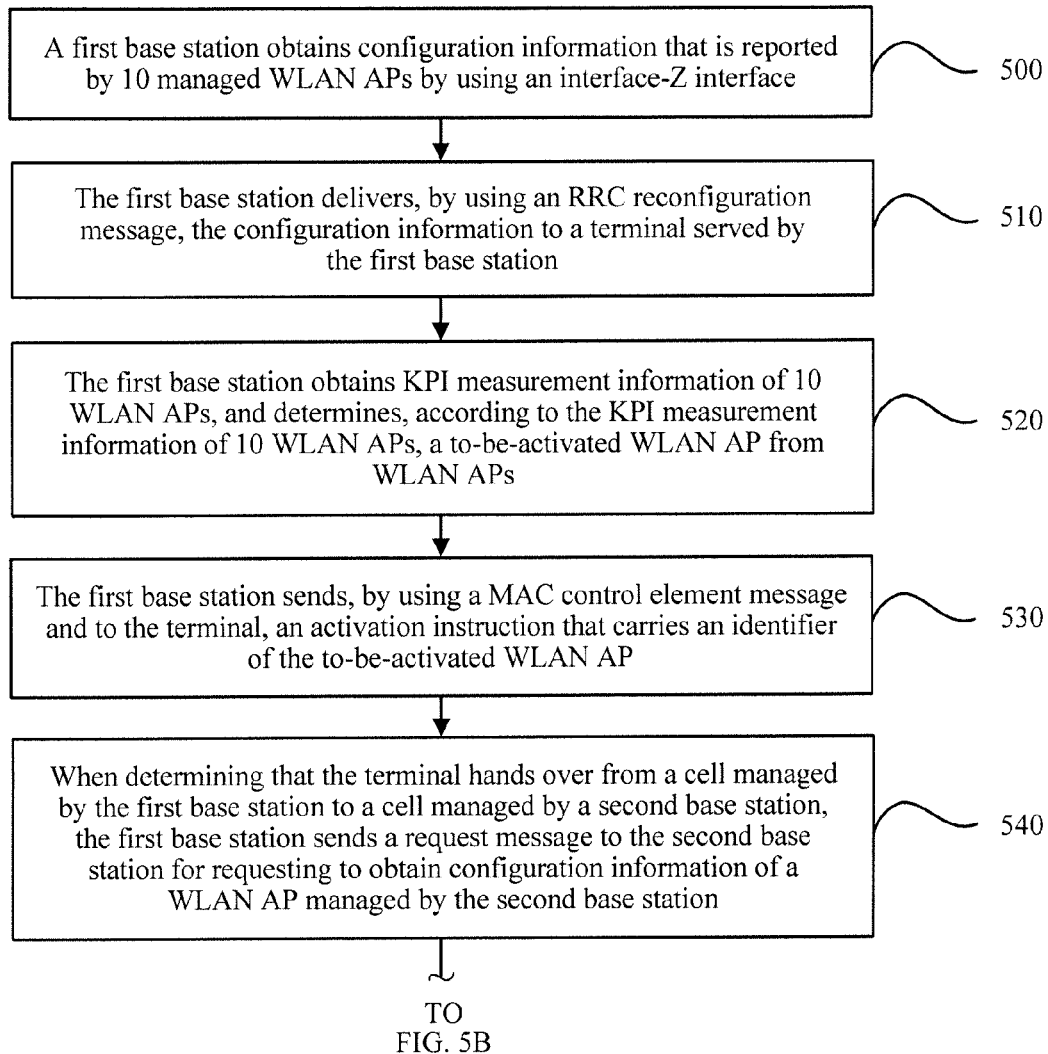
FIG. 5A to FIG. 5B are an embodiment of an offloading method according to an embodiment of the present invention.
Figure 5B:
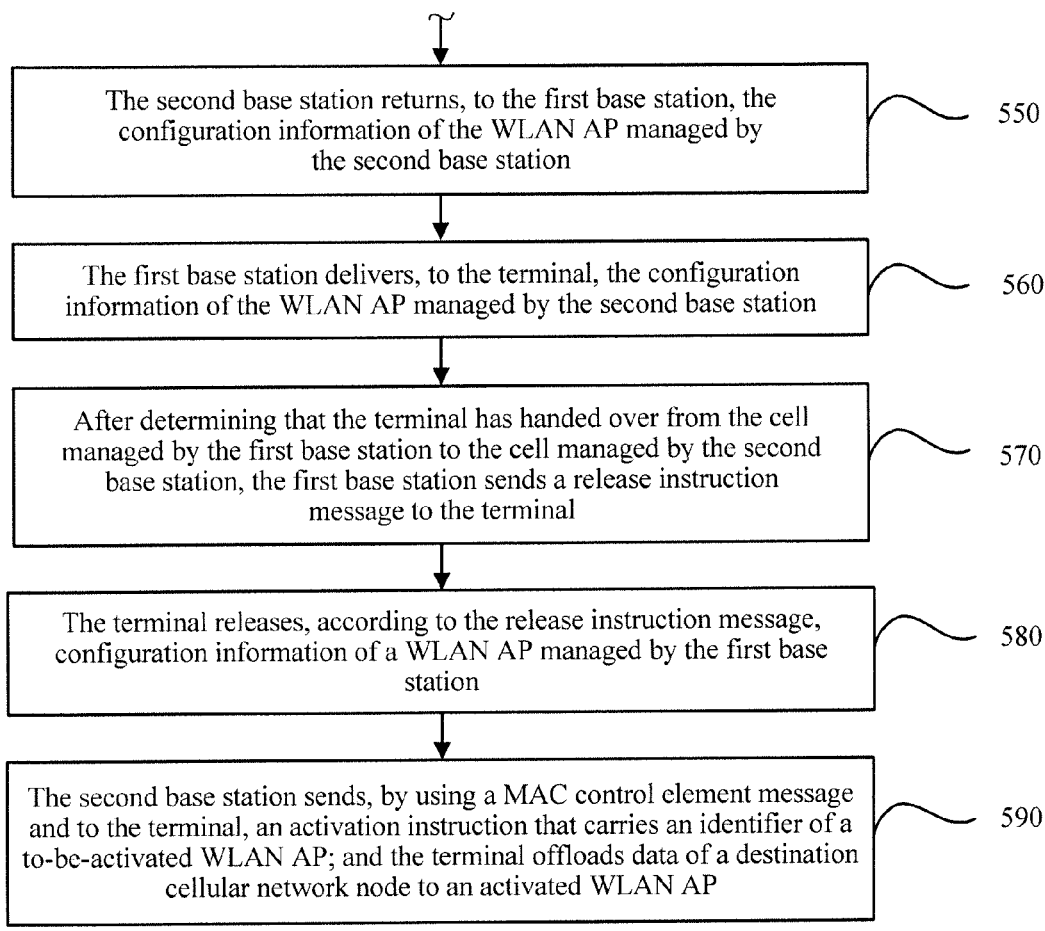

For a better understanding of an embodiment of the present invention, a specific application scenario is given below to describe, in further detail, a process of accessing a WLAN AP, as shown in FIG. 5A to FIG. 5B.

Step 500: A first base station obtains configuration information that is reported by 10 managed WLAN APs by using an interface-Z interface.

Step 510: The first base station delivers, by using an RRC reconfiguration message, the configuration information to a terminal served by the first base station.

Step 520: The first base station obtains KPI measurement information of 10 WLAN APs, and determines, according to the KPI measurement information of 10 WLAN APs, a to-be-activated WLAN AP from WLAN APs.

Step 530: The first base station sends, by using a MAC control element message and to the terminal, an activation instruction that carries an identifier of the to-be-activated WLAN AP.

Step 540: When determining that the terminal needs to hand over from a cell managed by the first base station to a cell managed by a second base station, the first base station sends a request message to the second base station for requesting to obtain configuration information of a WLAN AP managed by the second base station.

Step 550: The second base station returns, to the first base station, the configuration information of the WLAN AP managed by the second base station.

Step 560: The first base station delivers, to the terminal, the configuration information of the WLAN AP managed by the second base station.

Step 570: After determining that the terminal has handed over from the cell managed by the first base station to the cell managed by the second base station, the first base station sends a release instruction message to the terminal.

Step 580: The terminal releases, according to the release instruction message, configuration information of a WLAN AP managed by the first base station.

Step 590: The second base station sends, by using a MAC control element message and to the terminal, an activation instruction that carries an identifier of a to-be-activated WLAN AP; and the terminal offloads data of a destination cellular network node to an activated WLAN AP.

Figure 6A:
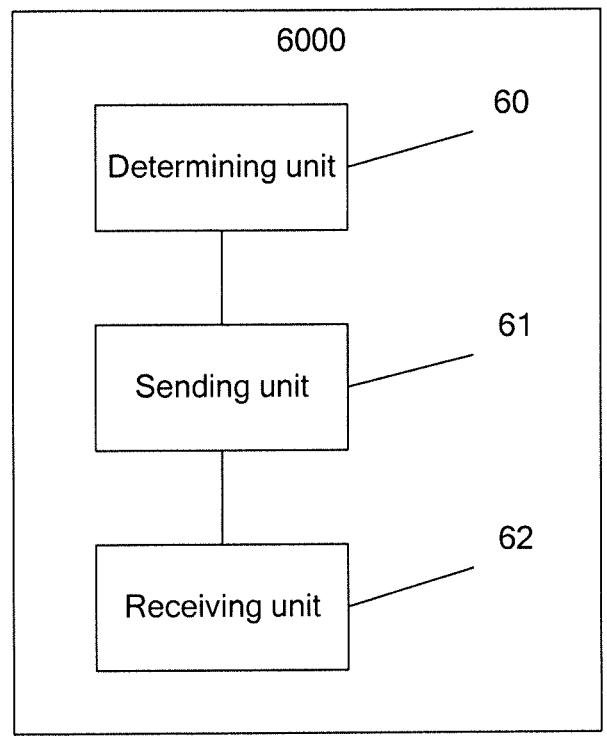
FIG. 6A is a schematic structural diagram of a source cellular network node according to an embodiment of the present invention.

Based on technical solutions of the foregoing corresponding methods, referring to FIG. 6A, an embodiment of the present invention provides a schematic structural diagram of a source cellular network node 6000, where the source cellular network node 6000 includes a determining unit 60, a sending unit 61, and a receiving unit 62.

The determining unit 60 is configured to determine that a terminal needs to hand over from the source cellular network node to a destination cellular network node.

The sending unit 61 is configured to send a handover request to the destination cellular network node, where the handover request is used to obtain configuration information of a WLAN AP managed by the destination cellular network node, and the WLAN AP has an attribute of receiving data sent by a cellular network radio access device or sending data to a cellular network radio access device.

The receiving unit 62 is configured to receive the configuration information that is of the WLAN AP managed by the destination cellular network node and that is fed back by the destination cellular network node.

The sending unit 61 is further configured to send, to the terminal, the configuration information of the WLAN AP managed by the destination cellular network node, so that the terminal selects configuration information of a destination WLAN AP according to the configuration information of the WLAN AP managed by the destination cellular network node, and offloads data of the destination cellular network node to the destination WLAN AP.

In this embodiment of the present invention, further, the sending unit 61 is further configured to send a release instruction message to the terminal, where the release instruction message is used to instruct the terminal to release configuration information of a WLAN AP managed by the source cellular network node.

In this embodiment of the present invention, further, the receiving unit 62 is further configured to obtain the configuration information reported by the WLAN AP managed by the source cellular network node; and the sending unit 61 is further configured to deliver, to the terminal, the configuration information reported by the WLAN AP managed by the source cellular network node.

In this embodiment of the present invention, optionally, the receiving unit 62 is configured to:

obtain the configuration information that is reported by the WLAN AP by using an interface, where the WLAN AP is managed by the source cellular network node.

In this embodiment of the present invention, optionally, the sending unit 61 is configured to:

deliver, by using a radio resource control RRC reconfiguration message or a broadcast message and to the terminal, the configuration information reported by the WLAN AP managed by the source cellular network node.

In this embodiment of the present invention, further, if a WLAN AP managed by the source cellular network node is added, the sending unit 61 is further configured to:

deliver obtained configuration information of the added WLAN AP to the terminal; or if the configuration information of the WLAN AP managed by the source cellular network node is changed, the sending unit 61 is further configured to:

deliver, to the terminal, changed configuration information that is obtained and that is of a WLAN AP whose corresponding configuration information is changed.

In this embodiment of the present invention, further, the receiving unit 62 is further configured to:

obtain measurement information, and determine, according to the measurement information, a to-be-activated WLAN AP from WLAN APs managed by the source cellular network node; and the sending unit 61 is further configured to:

send, to the terminal, an activation instruction that carries an identifier of the to-be-activated WLAN AP, so that the terminal activates the to-be-activated WLAN AP.

In this embodiment of the present invention, further, the receiving unit 62 is further configured to:

obtain measurement information, and determine, according to the measurement information, a to-be-activated WLAN AP from WLAN APs managed by the source cellular network node; and the sending unit 61 is further configured to:

deliver the configuration information and the identifier of the to-be-activated WLAN AP to the terminal.

In this embodiment of the present invention, further, the sending unit 61 is further configured to:

send, by using an RRC reconfiguration message, a medium access control MAC control element message, or a scheduling control physical downlink control channel PDCCH message and to the terminal, the activation instruction that carries the identifier of the to-be-activated WLAN AP.

In this embodiment of the present invention, optionally, the measurement information includes first measurement information of the source cellular network node, second measurement information of the WLAN AP managed by the source cellular network node, and third measurement information of the terminal.

In this embodiment of the present invention, optionally, configuration information of any WLAN AP in WLAN APs includes one or any combination of the following:

basic service set identifier BSSID information, MAC address information, service set identifier SSID information, frequency information, bandwidth information, or channel information.

In this embodiment of the present invention, optionally, the source cellular network node is any one of a base station, a single RAN coordinator SRC, or an access controller AC; and the destination cellular network node is any one of a base station, an SRC, or an AC.

Figure 6B:
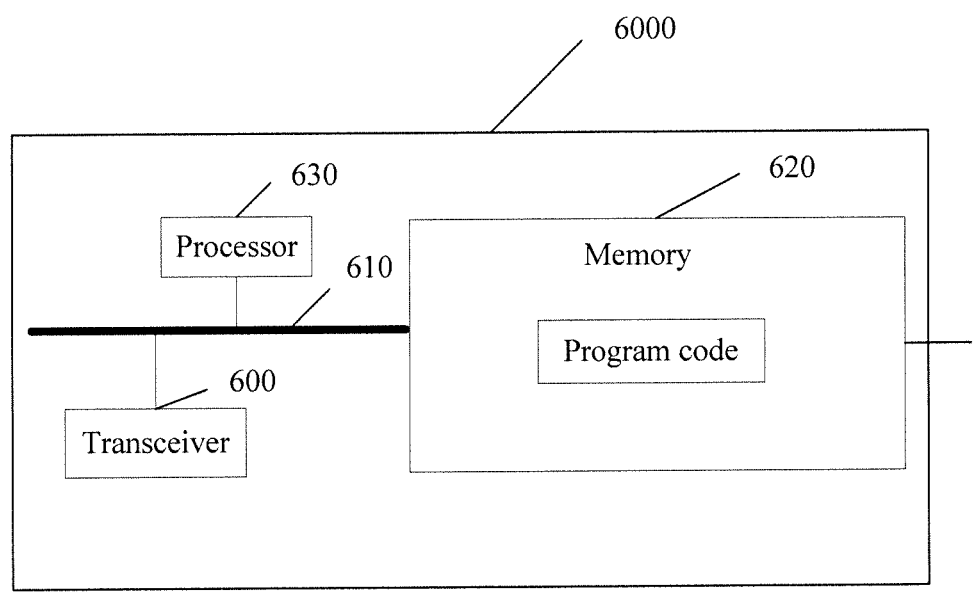
FIG. 6B is another schematic structural diagram of a source cellular network node according to an embodiment of the present invention.

As shown in FIG. 6B, FIG. 6B is another schematic structural diagram of a source cellular network node 6000 according to an embodiment of the present invention. The source cellular network node 6000 includes a transceiver 600, a communications bus 610, a memory 620, and a processor 630.

The communications bus 610 is configured to implement connection and communication between the processor 630, the transceiver 600, and the memory 620.

The memory 620 is configured to store program code.

The processor 630 is configured to invoke the program code stored in the memory 620 to perform the following operation:

determining that a terminal needs to hand over from a source cellular network node to a destination cellular network node.

The transceiver 600 is configured to: send a handover request to the destination cellular network node, where the handover request is used to obtain configuration information of a WLAN AP managed by the destination cellular network node, and the WLAN AP has an attribute of receiving data sent by a cellular network radio access device or sending data to a cellular network radio access device; receive the configuration information that is of the WLAN AP managed by the destination cellular network node and that is fed back by the destination cellular network node; and send, to the terminal, the configuration information of the WLAN AP managed by the destination cellular network node, so that the terminal selects a destination WLAN AP according to the configuration information of the WLAN AP managed by the destination cellular network node, and offloads data of the destination cellular network node to the destination WLAN AP.

Figure 7A:
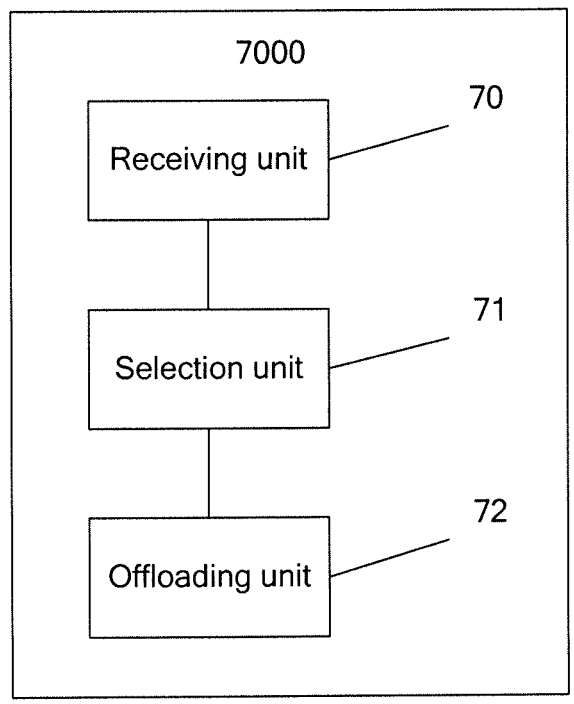
FIG. 7A is a schematic structural diagram of a terminal according to an embodiment of the present invention.

Based on technical solutions of the foregoing corresponding methods, referring to FIG. 7A, an embodiment of the present invention provides a schematic structural diagram of a terminal 7000, where the terminal 7000 includes a receiving unit 70, a selection unit 71, and an offloading unit 72.

The receiving unit 70 is configured to receive configuration information that is of a WLAN AP managed by a destination cellular network node and that is obtained by a source cellular network node, where the WLAN AP has an attribute of receiving data sent by a cellular network radio access device or sending data to a cellular network radio access device.

The selection unit 71 is configured to select a destination WLAN AP according to the configuration information of the WLAN AP managed by the destination cellular network node.

The offloading unit 72 is configured to offload data of the destination cellular network node to the destination WLAN AP.

In this embodiment of the present invention, further, the receiving unit 70 is further configured to:

receive a release instruction message sent by the source cellular network node; and the terminal further includes: a release unit, configured to release configuration information of a WLAN AP managed by the source cellular network node.

In this embodiment of the present invention, further, the receiving unit 70 is further configured to:

receive the configuration information that is of the WLAN AP managed by the source cellular network node and that is sent by the source cellular network node; and the offloading unit 72 is further configured to:

perform configuration according to the configuration information of the WLAN AP managed by the source cellular network node.

In this embodiment of the present invention, optionally, the receiving unit 70 is configured to:

receive the configuration information that is of the WLAN AP managed by the source cellular network node and that is sent by the source cellular network node by using a radio resource control RRC reconfiguration message or a broadcast message.

In this embodiment of the present invention, further, the receiving unit 70 is further configured to:

receive configuration information of an additional WLAN AP managed by the source cellular network node; or receive changed configuration information of a WLAN AP whose corresponding configuration information is changed, where the WLAN AP is managed by the source cellular network node.

In this embodiment of the present invention, further, the receiving unit 70 is further configured to:

receive an identifier that is of a to-be-activated WLAN AP and that is sent by the source cellular network node; and the terminal further includes: an activation unit, configured to activate the to-be-activated WLAN AP according to the identifier of the to-be-activated WLAN AP.

In this embodiment of the present invention, further, the receiving unit 70 is further configured to:

receive an activation instruction that carries the identifier of the to-be-activated WLAN AP and that is sent by the source cellular network node.

In this embodiment of the present invention, optionally, the receiving unit 70 is configured to:

receive the activation instruction that carries the identifier of the to-be-activated WLAN AP and that is sent by the source cellular network node by using an RRC reconfiguration message, a medium access control MAC control element message, or a scheduling control physical downlink control channel PDCCH message.

In this embodiment of the present invention, optionally, configuration information of the WLAN AP includes one or any combination of the following:

basic service set identifier BSSID information, MAC address information, service set identifier SSID information, frequency information, bandwidth information, or channel information.

In this embodiment of the present invention, optionally, the source cellular network node is any one of a base station, a single RAN coordinator SRC, or an access controller AC; and the destination cellular network node is any one of a base station, an SRC, or an AC.

Figure 7B:
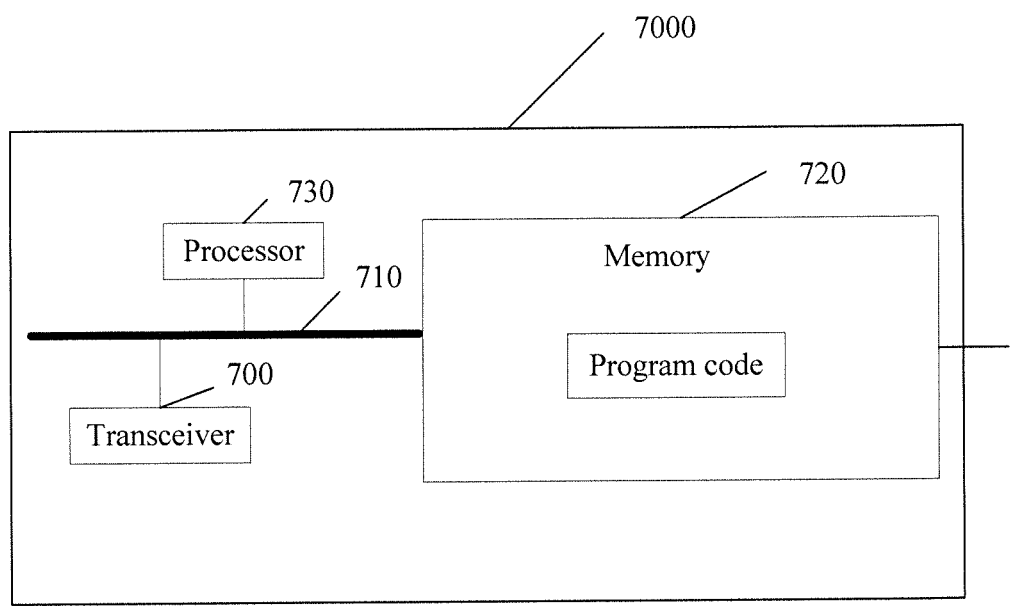
FIG. 7B is another schematic structural diagram of a terminal according to an embodiment of the present invention.

As shown in FIG. 7B, FIG. 7B is another schematic structural diagram of a terminal 7000 according to an embodiment of the present invention. The terminal 7000 includes a transceiver 700, a communications bus 710, a memory 720, and a processor 730.

The transceiver 700 is configured to communicate with an external device.

The communications bus 710 is configured to implement connection and communication between the processor 730, the transceiver 700, and the memory 720.

The memory 720 is configured to store program code.

The processor 730 is configured to invoke the program code stored in the memory 720 to perform the following operations:

receiving configuration information that is of a WLAN AP managed by a destination cellular network node and that is obtained by a source cellular network node, where the WLAN AP has an attribute of receiving data sent by a cellular network radio access device or sending data to a cellular network radio access device;

selecting a destination WLAN AP according to the configuration information of the WLAN AP managed by the destination cellular network node; and offloading data of the destination cellular network node to the destination WLAN AP.

Figure 8A:
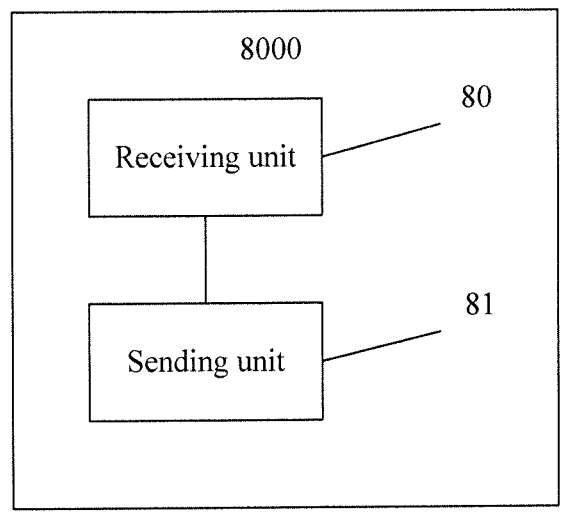
FIG. 8A is a schematic structural diagram of a destination cellular network node according to an embodiment of the present invention.

Based on technical solutions of the foregoing corresponding methods, referring to FIG. 8A, an embodiment of the present invention provides a schematic structural diagram of a destination cellular network node 8000, where the destination cellular network node 8000 includes a sending unit 80 and a receiving unit 81.

The receiving unit 81 is configured to receive a handover request that is sent by a source cellular network node and that is used to request a handover of a terminal from the source cellular network node to the destination cellular network node, where the handover request is used to obtain configuration information of a WLAN AP managed by the destination cellular network node, and the WLAN AP has an attribute of receiving data sent by a cellular network radio access device or sending data to a cellular network radio access device.

The sending unit 80 is configured to send, by using the source cellular network node and to the terminal, the configuration information of the WLAN AP managed by the destination cellular network node, so that the terminal selects a destination WLAN AP according to the configuration information of the WLAN AP, and offloads data of the destination cellular network node to the destination WLAN AP.

In this embodiment of the present invention, optionally, configuration information of any WLAN AP in WLAN APs includes one or any combination of the following:

basic service set identifier BSSID information, medium access control MAC address information, service set identifier SSID information, frequency information, bandwidth information, or channel information.

In this embodiment of the present invention, optionally, the source cellular network node is any one of a base station, a single RAN coordinator SRC, or an access controller AC; and the destination cellular network node is any one of a base station, an SRC, or an AC.

Figure 8B:
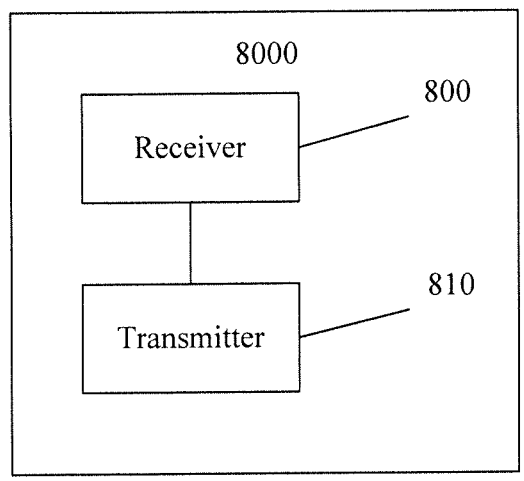
FIG. 8B is another schematic structural diagram of a destination cellular network node according to an embodiment of the present invention.

Based on technical solutions of the foregoing corresponding methods, referring to FIG. 8B, an embodiment of the present invention provides a schematic structural diagram of a destination cellular network node 8000, where the destination cellular network node 8000 includes a transmitter 80 and a receiver 81.

The receiver 81 is configured to receive a handover request that is sent by a source cellular network node and that is used to request a handover of a terminal from the source cellular network node to the destination cellular network node, where the handover request is used to obtain configuration information of a WLAN AP managed by the destination cellular network node, and the WLAN AP has an attribute of receiving data sent by a cellular network radio access device or sending data to a cellular network radio access device.

The transmitter 80 is configured to send, by using the source cellular network node and to the terminal, the configuration information of the WLAN AP managed by the destination cellular network node, so that the terminal selects a destination WLAN AP according to the configuration information of the WLAN AP, and the terminal offloads data of the destination cellular network node to the destination WLAN AP.

In conclusion, embodiments of the present invention provide an offloading method: A source cellular network node determines that a terminal needs to hand over from the source cellular network node to a destination cellular network node; the source cellular network node sends a handover request to the destination cellular network node, where the handover request is used to obtain configuration information of a WLAN AP managed by the destination cellular network node, and the WLAN AP has an attribute of receiving data sent by a cellular network radio access device or sending data to a cellular network radio access device; the source cellular network node receives the configuration information that is of the WLAN AP managed by the destination cellular network node and that is fed back by the destination cellular network node; and the source cellular network node sends, to the terminal, the configuration information of the WLAN AP managed by the destination cellular network node, so that the terminal selects a destination WLAN AP according to the configuration information of the WLAN AP managed by the destination cellular network node, and the terminal offloads data of the destination cellular network node to the destination WLAN AP. In this solution, when the terminal is in a handover process, the destination cellular network node sends, to the terminal, configuration information of the WLAN AP managed by the destination cellular network node; and then the terminal selects the destination WLAN AP from WLAN APs managed by the destination cellular network node, and offloads data of the destination cellular network node to the destination WLAN AP. Therefore, the destination WLAN AP selected by the destination cellular network node can be received before a handover is completed, thereby ensuring service continuity and improving service quality of a terminal.

The present invention is described with reference to the flowcharts and/or block diagrams of the method, the device (system), and the computer program product according to the embodiments of the present invention. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may also be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may also be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although some preferred embodiments of the present invention have been described, persons skilled in the art can make changes and modifications to these embodiments once they learn the basic inventive concept. Therefore, the following claims are intended to be construed as to cover the preferred embodiments and all changes and modifications falling within the scope of the present invention.

Obviously, persons skilled in the art can make various modifications and variations to the embodiments of the present invention without departing from the scope of the embodiments of the present invention. The present invention is intended to cover these modifications and variations provided that they fall within the scope of protection defined by the following claims and their equivalent technologies.

What is claimed is:

1. An offloading method, comprising:
   receiving, by a terminal, configuration information that is of a WLAN AP managed by a source cellular network node and that is sent by the source cellular network node;
   receiving, by the terminal, an identifier that is of a to-be-activated WLAN AP and that is sent by the source cellular network node;
   activating, by the terminal, the to-be-activated WLAN AP according to the identifier of the to-be-activated WLAN AP;
   performing, by the terminal, configuration according to the configuration information of the WLAN AP managed by the source cellular network node;
   receiving, by the terminal, configuration information that is of the WLAN AP managed by a destination cellular network node and that is obtained by the source cellular network node, wherein the WLAN AP has an attribute of receiving data sent by a cellular network radio access device or sending data to the cellular network radio access device;
   selecting, by the terminal according to the configuration information of the WLAN AP managed by the destination cellular network node, a destination WLAN AP; and
   offloading, by the terminal, data of the destination cellular network node to the destination WLAN AP.

2. The method according to claim 1, after the offloading, by the terminal, data of the destination cellular network node to the destination WLAN AP, further comprising:
   receiving, by the terminal, a release instruction message sent by the source cellular network node; and
   releasing, by the terminal, configuration information of a WLAN AP managed by the source cellular network node.

3. The method according to claim 1, wherein the receiving, by the terminal, the configuration information that is of the WLAN AP managed by the source cellular network node and that is sent by the source cellular network node comprises:
   receiving, by the terminal, the configuration information that is of the WLAN AP managed by the source cellular network node and that is sent by the source cellular network node by using a radio resource control (RRC) reconfiguration message or a broadcast message.

4. The method according to claim 1, before the receiving, by the terminal, the configuration information that is of the WLAN AP managed by the source cellular network node and that is sent by the source cellular network node, further comprising:
   receiving, by the terminal, configuration information of an additional WLAN AP managed by the source cellular network node; or
   receiving, by the terminal, changed configuration information of a WLAN AP whose corresponding configuration information is changed, wherein the WLAN AP is managed by the source cellular network node.

5. The method according to claim 1, wherein the receiving, by the terminal, an identifier that is of the to-be-activated WLAN AP and that is sent by the source cellular network node comprises:
   receiving, by the terminal, an activation instruction that carries the identifier of the to-be-activated WLAN AP and that is sent by the source cellular network node.

6. The method according to claim 5, wherein the receiving, by the terminal, an activation instruction that carries the identifier of the to-be-activated WLAN AP and that is sent by the source cellular network node comprises:
   receiving, by the terminal, the activation instruction that carries the identifier of the to-be-activated WLAN AP and that is sent by the source cellular network node by using an RRC reconfiguration message, a medium access control MAC control element message, or a scheduling control physical downlink control channel PDCCH message.

7. The method according to claim 1, wherein configuration information of a WLAN AP comprises one or any combination of the following:
   basic service set identifier (BSSID) information, MAC address information, service set identifier (SSID) information, frequency information, bandwidth information, or channel information.

8. The method according to claim 1, wherein the source cellular network node is any one of a base station, a single RAN coordinator (SRC), or an access controller (AC); and the destination cellular network node is any one of a base station, an SRC, or an AC.

9. A terminal, comprising:
   a receiver, configured to receive configuration information that is of a WLAN AP managed by a destination cellular network node and that is obtained by a source cellular network node, wherein the WLAN AP has an attribute of receiving data sent by a cellular network radio access device or sending data to the cellular network radio access device; and
   a processor, configured to select a destination WLAN AP according to the configuration information of the WLAN AP managed by the destination cellular network node; and
   to offload data of the destination cellular network node to the destination WLAN AP;

wherein the receiver is configured to:
receive the configuration information that is of the WLAN AP managed by the source cellular network node and that is sent by the source cellular network node; and
the offloading unit is further configured to:
perform configuration according to the configuration information of the WLAN AP managed by the source cellular network node;
wherein the receiver is configured to:
receive an identifier that is of the to-be-activated WLAN AP and that is sent by the source cellular network node; and
the terminal further comprises: an activation unit, configured to activate the to-be-activated WLAN AP according to the identifier of the to-be-activated WLAN AP.

10. The terminal according to claim 9, wherein the receiver is configured to:
receive a release instruction message sent by the source cellular network node; and
the terminal further comprises: a release unit, configured to release configuration information of a WLAN AP managed by the source cellular network node.

11. The terminal according to claim 9, wherein the receiver is configured to:
receive the configuration information that is of the WEAN AP managed by the source cellular network node and that is sent by the source cellular network node by using a radio resource control RRC reconfiguration message or a broadcast message.

12. The terminal according to claim 9, wherein the receiver is configured to:
receive configuration information of an additional WLAN AP managed by the source cellular network node; or
receive changed configuration information of a WLAN AP whose corresponding configuration information is changed, wherein the WLAN AP is managed by the source cellular network node.

13. The terminal according to claim 9, wherein the receiver is configured to:
receive an activation instruction that carries the identifier of the to-be-activated WLAN AP and that is sent by the source cellular network node.

14. The terminal according to claim 13, wherein the receiver is configured to:
receive the activation instruction that carries the identifier of the to-be-activated WLAN AP and that is sent by the source cellular network node by using an RRC reconfiguration message, a medium access control MAC control element message, or a scheduling control physical downlink control channel PDCCH message.

15. The terminal according to claim 9, wherein configuration information of the WLAN AP comprises one or any combination of the following:
basic service set identifier BSSID information, MAC address information, service set identifier SSID information, frequency information, bandwidth information, or channel information.

16. The terminal according to claim 9, wherein the source cellular network node is any one of a base station, a single RAN coordinator SRC, or an access controller AC; and the destination cellular network node is any one of a base station, an SRC, or an AC.

* * * * *

UNITED STATES PATENT AND TRADEMARK OFFICE
CERTIFICATE OF CORRECTION

PATENT NO. : 9,883,439 B2
APPLICATION NO. : 15/471395
DATED : January 30, 2018
INVENTOR(S) : Xiaoli Shi et al.

It is certified that error appears in the above-identified patent and that said Letters Patent is hereby corrected as shown below:

In the Claims

Column 25, Line 25:
In Claim 11, delete "WEAN" and insert -- WLAN --, therefore.

Signed and Sealed this
Tenth Day of April, 2018

Andrei Iancu
*Director of the United States Patent and Trademark Office*